United States Patent
Carson et al.

(10) Patent No.: US 7,528,840 B1
(45) Date of Patent: May 5, 2009

(54) OPTIMIZING THE EXECUTION OF MEDIA PROCESSING ROUTINES USING A LIST OF ROUTINE IDENTIFIERS

(75) Inventors: Kenneth M. Carson, Mill Valley, CA (US); Randy Ubillos, Los Altos, CA (US); Eric Graves, Wayne, PA (US)

(73) Assignee: Apple Inc., Cupertino, CA (US)

( * ) Notice: Subject to any disclaimer, the term of this patent is extended or adjusted under 35 U.S.C. 154(b) by 841 days.

(21) Appl. No.: 10/677,574

(22) Filed: Oct. 1, 2003

(51) Int. Cl.
G09G 5/36 (2006.01)
G06T 1/00 (2006.01)
G06F 12/02 (2006.01)

(52) U.S. Cl. .................. 345/557; 345/522; 345/544
(58) Field of Classification Search .......... 345/557, 345/530, 501–503, 522, 543, 544; 711/118, 711/170–173; 712/205
See application file for complete search history.

(56) References Cited

U.S. PATENT DOCUMENTS

| 4,876,651 | A * | 10/1989 | Dawson et al. ............. 701/200 |
| 5,357,604 | A * | 10/1994 | San et al. ................... 463/31 |
| 5,630,075 | A * | 5/1997 | Joshi et al. ................. 711/100 |
| 5,657,478 | A * | 8/1997 | Recker et al. ............... 345/503 |
| 5,945,997 | A * | 8/1999 | Zhao et al. .................. 345/581 |
| 6,016,151 | A * | 1/2000 | Lin ............................. 345/582 |
| 6,088,701 | A * | 7/2000 | Whaley et al. .............. 707/102 |
| 6,269,390 | B1 * | 7/2001 | Boland ....................... 718/100 |
| 6,353,874 | B1 * | 3/2002 | Morein ....................... 711/118 |
| 6,470,443 | B1 * | 10/2002 | Emer et al. .................. 712/205 |
| 6,738,895 | B1 * | 5/2004 | Klein .......................... 712/205 |
| 6,798,421 | B2 * | 9/2004 | Baldwin ...................... 345/557 |
| 6,809,732 | B2 * | 10/2004 | Zatz et al. .................... 345/503 |
| 6,933,945 | B2 * | 8/2005 | Emberling .................. 345/557 |
| 6,958,757 | B2 * | 10/2005 | Karlov ........................ 345/557 |
| 6,995,770 | B2 * | 2/2006 | Ngai ........................... 345/522 |
| 7,006,101 | B1 * | 2/2006 | Brown et al. ................ 345/561 |

OTHER PUBLICATIONS

"Lookup table," http://en.wikipedia.org/wiki/Lookup_table.*

* cited by examiner

*Primary Examiner*—Kee M Tung
*Assistant Examiner*—Joni Hsu
(74) *Attorney, Agent, or Firm*—Adeli & Tollen LLP

(57) ABSTRACT

Methods for analyzing a list of routine identifiers to optimize processing of routines identified in the list. Some embodiments execute a set of routines in multiple passes where each pass comprises each routine in the set processing a single band of its source. The band size of the sources of the set is related to the size of a cache used during execution of the set. A band size of sources of the set is determined so that all data processed by and produced by any routine in the set can be stored to the cache while the routine processes one band of its source. Some embodiments use the list to combine two or more routines into a single routine where the list is modified accordingly. Some embodiments use the list for grouping and re-ordering routines identified in the list to send particular routines to an alternative processor for processing.

18 Claims, 8 Drawing Sheets

OPTIMIZING THE EXECUTION OF MEDIA PROCESSING ROUTINES USING A LIST OF ROUTINE IDENTIFIERS

FIELD OF THE INVENTION

The invention addresses optimizing the execution of media processing routines using a list of routine identifiers.

BACKGROUND OF THE INVENTION

Media presentations typically include a video stream that may be a composite of various video sources. Currently, media presentations are produced using image processing operations that are performed in full frame steps. These full frame operations require the use of full frame buffers that each hold data for an entire frame of video. An image processing operation is typically executed by a processor that uses a cache to hold recently used data. Since access times for a cache are typically lower than access times for a conventional buffer (e.g., random access memory (RAM)), use of a cache reduces processing times.

Processing time, however, is increased whenever there is a cache overflow, i.e., the data produced by an operation can not be stored to the cache and thus the data must be stored to another memory resource, e.g., RAM. Processing time is also increased whenever there is a cache "miss," i.e., the data required for an operation is not present in the cache and thus must be retrieved from another memory resource, e.g., RAM. In full frame operations, cache overflow and "misses" can be frequent if the cache can hold an amount of data that is less than the amount of data for a full frame of video. Thus, it is important to identify methods of processing media operations that reduces the number of cache overflows and "misses."

Media presentations may also include a video and audio stream where each stream is produced by multiple operations. Conventionally, the operations for the video or audio streams are executed in an order determined an application producing the video or audio streams. The order of operations is typically executed without regard to reducing the processing time required by the order of operations. Thus, it is also important to identify methods of processing media operations that reduce the processing time of a series of operations.

SUMMARY OF THE INVENTION

Methods for efficient execution of image processing routines to produce a final effect are provided. Some embodiments of the present invention determine an initial list of routine identifiers containing routine identifiers positioned in a specific order. The routine identifiers are used to call routines that are called and executed in an order specified by the list of routine identifiers to produce the final effect. Methods of the present invention analyze the list of routine identifiers to optimize processing times of the routines identified in the list.

Some embodiments provide methods for executing a set of two or more image processing routines. Each routine in the set of routines processes a source to produce output data, each source being comprised of two or more subparts referred to as bands. The set of routines is executed in two or more processing passes where a single pass of the set comprises each routine in the set performing a single processing pass where the routine processes a single band of its source. Multiple processing passes for the set of routines are performed until each source for each routine in the set is processed. In some embodiments, the band size of each source processed by a set of routines is related to the size of a cache used by the set of routines during execution. In some embodiments, a particular size of the bands of the sources is determined so that all source data processed by and all output data produced by any routine in the set of routines can be stored to the cache during a single processing pass of the routine whereby the routine processes a single band of its source.

Some embodiments provide a method for using an initial list of routine identifiers for determining one or more sets of two or more routine identifiers (composing a set of combinable routine identifiers) that identify two or more routines (composing a set of combinable routines) that are combinable into a single routine. For each set of combinable routine identifiers, the method determines a single routine identifier that identifies a single routine that performs each of the routines in the set of combinable routines. The method then replaces each set of combinable routine identifiers in the list with the single routine identifier to produce a modified list of routine identifiers that is processed in an order specified by the modified list of routine identifiers to produce the same particular final effect as would be produced by the initial list of routine identifiers.

Some embodiments provide a method for using an initial list of routine identifiers for re-ordering and grouping routines identified in the list in order to send particular routines to an alternative processor for processing. The method determines any routines identifiers (referred to as sendable routine identifiers) that identify routines (referred to as sendable routines) that are able to be processed by an alternative processor. The method then groups sendable routine identifiers into one or more sets of successive sendable routines identifiers to reduce the number of data transfers to and from the alternative processor when the sendable routines are called for processing. In some embodiments, grouping sendable routine identifiers into one or more sets of sendable routine identifiers further comprises re-ordering the position of one or more routine identifiers to produce a set of successive sendable routine identifiers. The method then replaces each sendable routine identifier or set of sendable routine identifiers in the list with an "alternative processor" routine identifier that identifies an "alternative processor" routine. When called, the "alternative processor" routine sends the routine(s) identified by a sendable routine identifier or set of sendable routine identifiers to an alternative processor and then receives data produced by the alternative processor. The method then executes routines in an order specified by the modified list of routine identifiers to produce the same particular final effect as would be produced by the initial list of routine identifiers.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
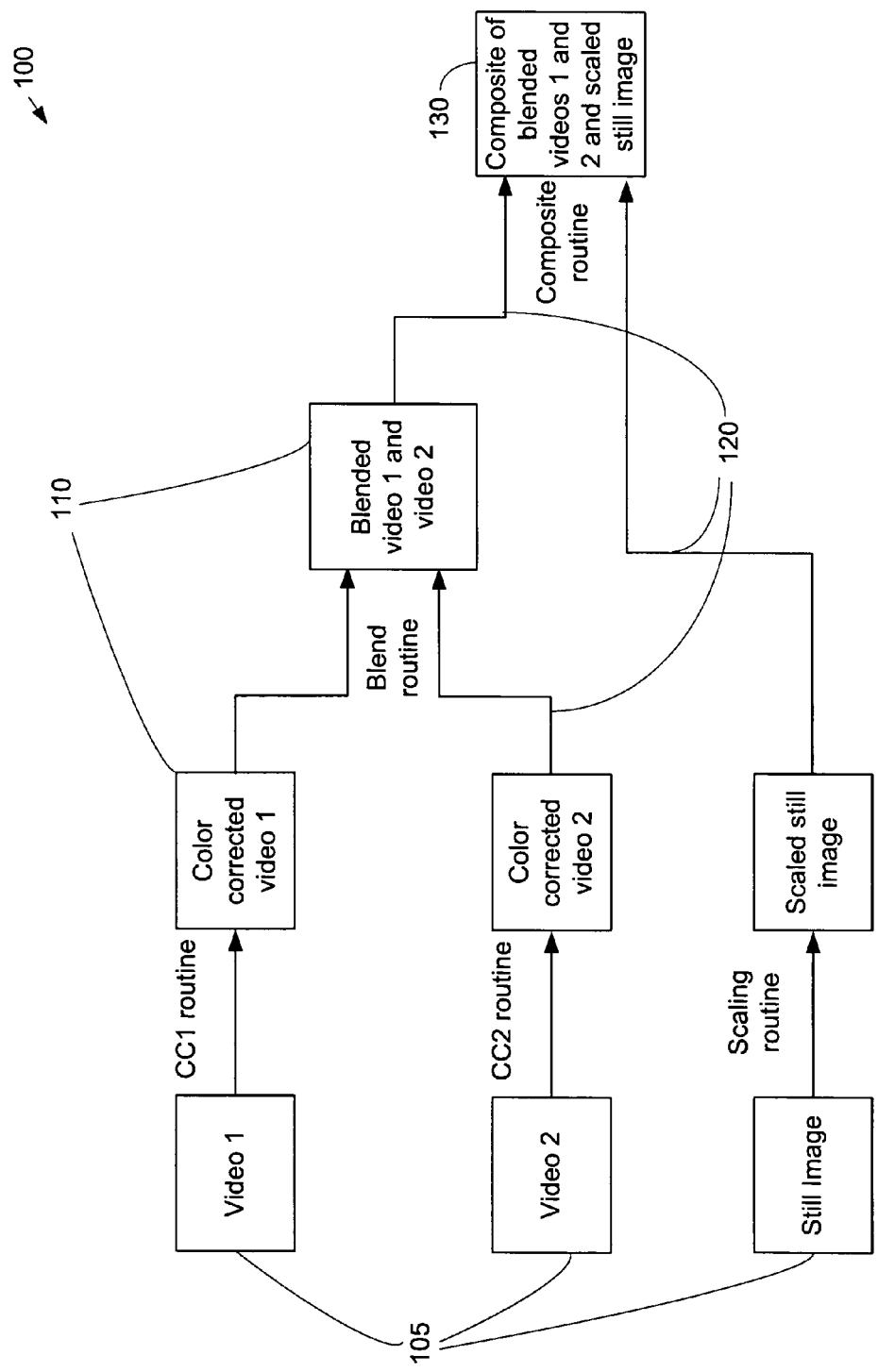
FIG. 1 is a graphical illustration of an effect tree that produces a final video effect.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Methods for efficient execution of image processing routines to produce a final effect are provided. Some embodiments of the present invention determine an initial list of routine identifiers containing routine identifiers positioned in a specific order. The routine identifiers are used to call routines that are called and executed in an order specified by the list of routine identifiers to produce the final effect. Methods of the present invention analyze the list of routine identifiers to optimize processing times of the routines identified in the list.

Some embodiments provide methods for executing a set of two or more image processing routines. Each routine in the set of routines processes a source to produce output data, each source being comprised of two or more subparts referred to as bands. The set of routines is executed in two or more processing passes where a single pass of the set comprises each routine in the set performing a single processing pass where the routine processes a single band of its source. Multiple processing passes for the set of routines are performed until each source for each routine in the set is processed. In some embodiments, the band size of each source processed by a set of routines is related to the size of a cache used by the set of routines during execution. In some embodiments, a particular size of the bands of the sources is determined so that all source data processed by and all output data produced by any routine in the set of routines can be stored to the cache during a single processing pass of the routine whereby the routine processes a single band of its source.

Some embodiments provide a method for using an initial list of routine identifiers for determining one or more sets of two or more routine identifiers (composing a set of combinable routine identifiers) that identify two or more routines (composing a set of combinable routines) that are combinable into a single routine. For each set of combinable routine identifiers, the method determines a single routine identifier that identifies a single routine that performs each of the routines in the set of combinable routines. The method then replaces each set of combinable routine identifiers in the list with the single routine identifier to produce a modified list of routine identifiers that is processed in an order specified by the modified list of routine identifiers to produce the same particular final effect as would be produced by the initial list of routine identifiers.

Some embodiments provide a method for using an initial list of routine identifiers for re-ordering and grouping routines identified in the list in order to send particular routines to an alternative processor for processing. The method determines any routines identifiers (referred to as sendable routine identifiers) that identify routines (referred to as sendable routines) that are able to be processed by an alternative processor. The method then groups sendable routine identifiers into one or more sets of successive sendable routines identifiers to reduce the number of data transfers to and from the alternative processor when the sendable routines are called for processing. In some embodiments, grouping sendable routine identifiers into one or more sets of sendable routine identifiers further comprises re-ordering the position of one or more routine identifiers to produce a set of successive sendable routine identifiers. The method then replaces each sendable routine identifier or set of sendable routine identifiers in the list with an "alternative processor" routine identifier that identifies an "alternative processor" routine. When called, the "alternative processor" routine sends the routine(s) identified by a sendable routine identifier or set of sendable routine identifiers to an alternative processor and then receives data produced by the alternative processor. The method then executes routines in an order specified by the modified list of routine identifiers to produce the same particular final effect as would be produced by the initial list of routine identifiers.

Some embodiments described below relate to the processing of routines in video applications. One of ordinary skill in the art, however, will realize that these embodiments may also relate to the processing of routines in a variety of media applications such as in audio applications. Some embodiments described below relate to video frames in YUV format. One of ordinary skill in the art, however, will realize that these embodiments may also relate to a variety of formats other than YUV. In addition, other video frame formats (such as RGB) can easily be transformed into the YUV format. Furthermore, some embodiments are described with reference to a video effects application. One of ordinary skill in the art, however, will realize that the teachings of the present invention may also relate to other video applications (e.g., teleconferencing, television broadcasting, internet streaming, communication, etc.) in real-time or post-time. Embodiments of the present invention may also be used with video sequences having different coding standards such as H.263 and H.264 (also known as MPEG-4/Part 10).

As used herein, a set of successive routine identifiers refers to identifiers that are positioned consecutively in a list of routine identifiers. Routines that are called using the set of successive routine identifiers are thus executed in a consecutive order determined by the list of routine identifiers. Also, as used herein, a "size" of a memory resource (such as a cache, buffer, band, etc.) refers to an amount of data that the memory resource can store or contains. Further, as used herein, a band size of a bandable routine refers to a band size of a source of the bandable routine.

The various embodiments described below provide a method for producing and analyzing a list of routine identifiers to optimize processing times of the routines identified in the list. In some embodiments, a set of routines is executed in two or more processing passes where a pass of the set comprises each routine in the set processing a single band of its source. These embodiments are described in Section I. In some embodiments, a method for producing the list of routine identifiers is provided, as described in Section II. In some embodiments, a list of routine identifiers is analyzed to optimize processing times of the routines identified in the list, as described in Section III.

FIG. 1 is a graphical illustration of an effect tree 100 comprised of video sources 105, video effects 110, and image processing routines 120 that produce a final video effect 130. As shown in FIG. 1, a video source 105 and a video effect 110 and 130 is represented by a box and an image processing routine 120 is represented by an arrow.

In the example of FIG. 1, a series of image processing routines is shown. A color correction 1 routine (CC1) is performed on a first video source (Video 1) to produce a color corrected effect of the first video source (color corrected video 1). A color correction 2 routine (CC2) is also performed on a second video source (Video 2) to produce a color corrected effect of the second video source (color corrected video 2). A blend routine then blends the color corrected videos 1 and 2 to produce a blended video 1 and video 2 effect. Also, a scaling routine is performed on a still image to produce a scaled effect of the still image (scaled still image). A composite operation is then performed on the blended videos 1 and 2 and the scaled still image to produce the final effect 130 that is the composite of the blended videos 1 and 2 and the scaled still image.

A video effect 110 and 130 represents a single frame of video data. Each frame (effect) is comprised of a plurality of pixels at pixel locations where each pixel location contains one or more pixel values (such as luminance and/or chrominance values). Pixels and pixel locations are identified by discrete row (e.g., i) and column (e.g., j) indices (i.e., coordinates) such that $1 \leq i \leq M$ and $1 \leq j \leq N$ where M×N is the size of the frame in pixel units. The final video effect 130 represents a final frame that is presented for display. The effect tree 100 may be used to produce a series of final frames.

Each image processing routine 120 processes one or more input sources (e.g., a video source 105 or video effect 110) to produce a single output effect. For example, the blend routine processes two video effects (color corrected video 1 and color corrected video 2) to produce a blended video 1 and video 2 effect. Each source and output effect represents a frame of video data that is typically stored in a data structure in a buffer. An image processing routine 120 that processes an input source is executed by a processor that typically uses a cache to store data recently used or produced by the image processing routine. Conventionally, an image processing routine is performed using full frame steps that can cause cache overflow or cache "misses."

Section I: Bandable Routines

Some embodiments provide methods for executing a set of two or more image processing routines. Each routine in the set of routines processes a source (e.g., a frame of video data) to produce output data, each source being comprised of two or more subparts referred to as bands. A band of a source is a portion of the source having a specific size as determined by methods of the present invention. In some embodiments, the band size of each source processed by a set of routines is related to the size of a cache used by the set of routines during execution. The set of routines are executed in two or more processing passes where a single pass of the set comprises each routine in the set performing a single processing pass of a single band of its source. Image processing routines that are able to be performed in multiple band-step passes are referred to herein as bandable image processing routines.

Figure 2:
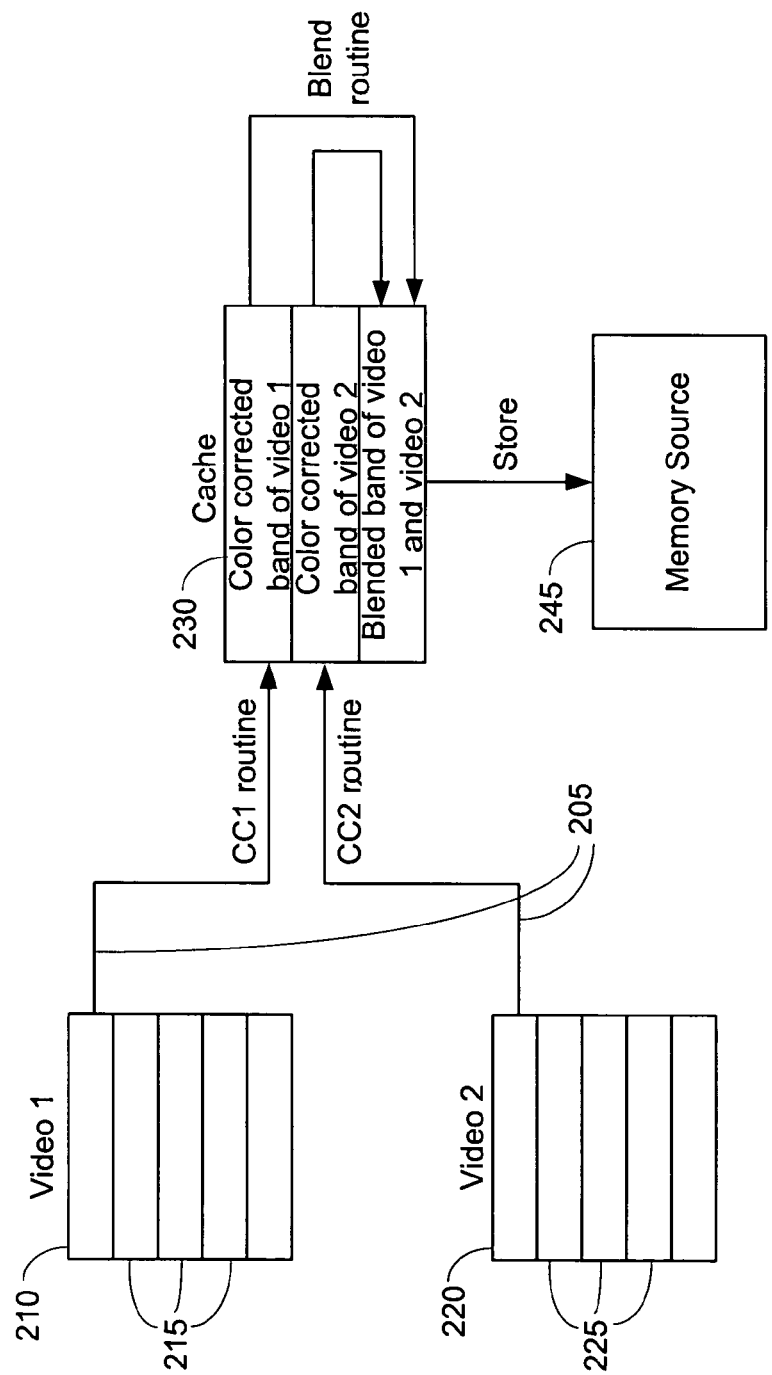
FIG. 2 is a conceptual illustration of a method for executing a set of bandable image processing routines 205 in accordance with the present invention.

FIG. 2 is a conceptual illustration of a method for executing a set of bandable image processing routines 205 in accordance with the present invention. In the example shown in FIG. 2, a first video source (video 1) 210 is divided into equal bands 215 and a second video source (video 2) 220 is also divided into equal bands 225. Video 1 210 and video 2 220 each represent a frame of video data that is typically stored in a buffer, e.g., RAM. As such, video 1 210 and video 2 220 may also each represent a buffer that stores data for a video frame where bands 215 and 225 of video 1 and 2 may represent a band of data (subset of data) of a video frame or a band (i.e., portion) of a buffer that stores a frame of video data. A cache 230 is used to store video data processed and produced by image processing routines 205.

In the example of FIG. 2, a color correction 1 routine (CC1) is performed on a first band of video 1 210 to produce a color corrected effect of the first band (color corrected band of video 1) that is stored to the cache 230. A color correction 2 routine (CC2) is also performed on a first band of video 2 220 to produce a color corrected effect of the first band (color corrected band of video 2) that is also stored to the cache 230. Typically, source data (i.e., data from a band of video 1 210 or video 2) would be read into the cache 230 just before each routine is performed and overwritten by the data produced by the routine or by data required by another routine. A blend routine then blends the color corrected bands of videos 1 and 2 (the data of which is in the cache 230) to produce a blended band of video 1 and video 2 effect that is stored to the cache 230.

In the example of FIG. 2, the bandable routines color correction 1, color correction 2, and blend compose a set of bandable routines. The color correction 1 routine performed on the first band of video 1 (i.e., a single pass of the CC1 routine), the color correction 2 routine performed on the first band of video 2 (i.e., a single pass of the CC2 routine), and the blend routine performed on the color corrected bands of videos 1 and 2 (i.e., a single pass of the blend routine) compose a single pass of the set of bandable routines. Passes of the set of bandable routines are repeated until each band of the sources of the set of bandable routines is processed. After each pass of the set of bandable routines, the resulting effect of the pass (e.g., the blended band of video 1 and video 2) is stored to a memory source 245 (e.g., a buffer) for later use.

In accordance with the present invention, a band size of the sources shown in FIG. 2 are determined so that all source data processed by and all output data produced by the color correction 1 and 2 and blend routines can be stored to the cache without overflow during a single processing pass of each routine. For example, for the blend routine, the source data (color corrected bands of videos 1 and 2) processed by the blend routine and the output data (blended band of video 1 and video 2) produced by the blend routine can be stored to the cache 230 without overflow during a single processing pass of the blend routine. Since the color correction 1 and 2 routines are performed just prior to the blend routine, the output data produced by these routines and required by the blend routine will typically still be held in the cache. As such, this data would not need to be retrieved from another memory resource thus preventing a cache "miss."

In some embodiments, the output data produced by one bandable routine in a set of bandable routines overwrites (in the cache) output data produced by another bandable routine in the set. For example, as shown in FIG. 2, the output data produced by the blend routine may overwrite (in the cache 230) output data produced by the color correction 1 or the color correction 2 routine. Note, however, that at a point in time when the output data of the blend routine is stored to the cache 230, any source data that is overwritten is no longer required by the blend routine. As such, in these embodiments, it still holds that all source data processed by and all output data produced by each bandable routine in a set of bandable routines is able to be stored to the cache during a single processing pass of the bandable routine.

Figure 3:
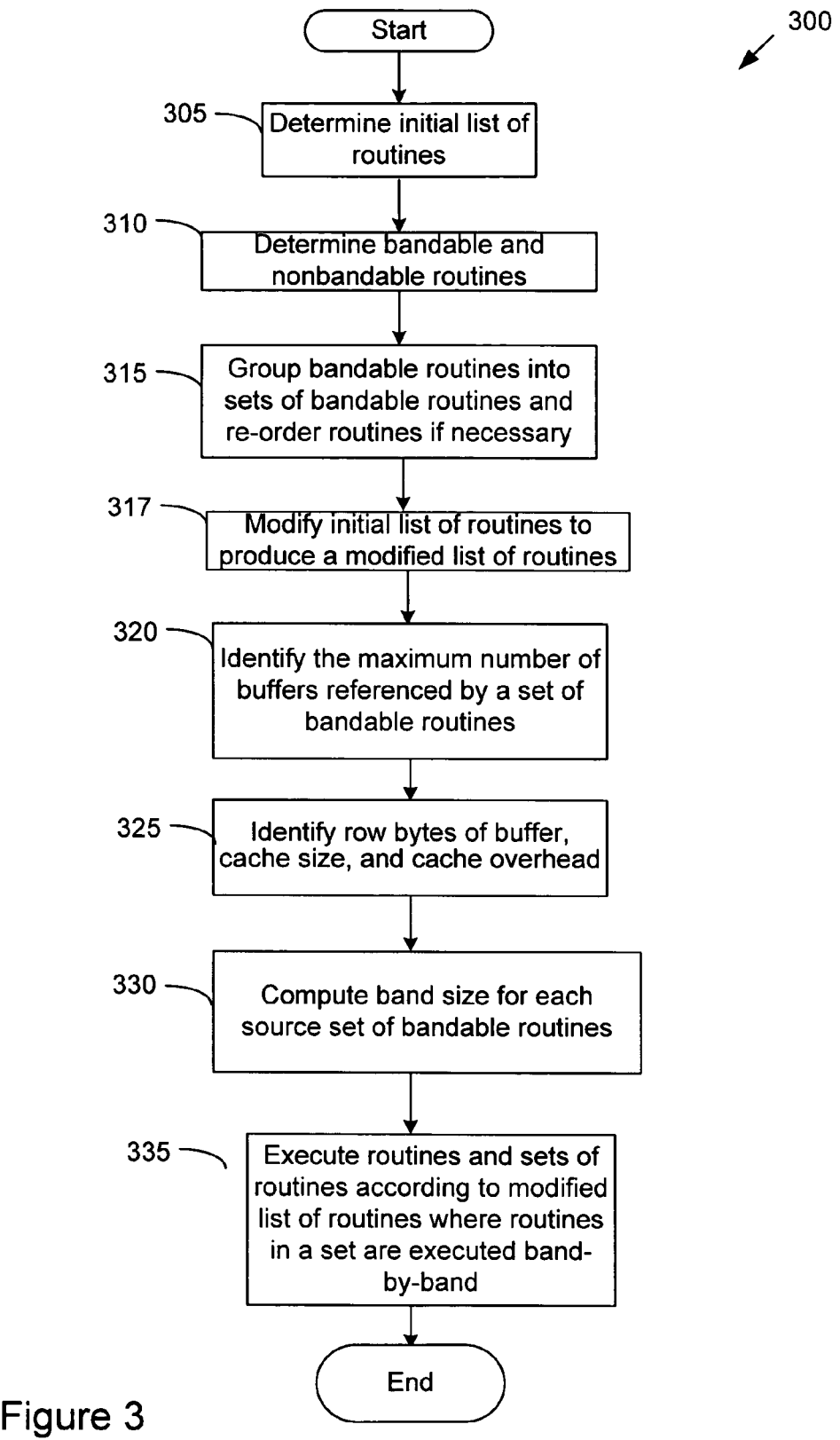
FIG. 3 is a flowchart of a method for performing bandable image processing routines.

FIG. 3 is a flowchart of a method 300 for performing bandable image processing routines. The method 300 begins when an initial list of image processing routine identifiers is determined (at 305), as described in relation to FIG. 25. The initial list of routine identifiers contains multiple routine identifiers (e.g., color correction 1, color correction 2, blend, scale, composite, etc.) listed in a specific order. Each routine identifier is used to identify and call a corresponding image processing routine (i.e., objects) containing instruction code that is executed to perform a particular image processing operation (e.g., color correction, blend, etc.). The routine identifiers are positioned in the initial list of routine identifiers in a specific order and hence the corresponding routines are called and executed in an order specified by the list to produce a particular final effect (a displayed frame).

Using the list of routine identifiers, the method determines (at 310) which routine identifiers in the initial list identify routines that are nonbandable. As used herein, a nonbandable routine is a routine that, during its execution, transfers pixel locations of a source to a different location in the output effect, the pixel location in the output effect being arbitrary. For example, scaling is a nonbandable operation. As a further example, color correction, blend, and composite are bandable operations. Determinations as to which routines are bandable or nonbandable can be made, for example, through use of a look-up table that contains routine identifier listings of bandable and/or nonbandable routines. As used herein, a bandable routine is identified by a bandable routine identifier and a nonbandable routine is identified by a nonbandable routine identifier.

If possible, the method then groups (at 315) bandable routine identifiers into one or more sets of bandable routines identifiers, the set of bandable routine identifiers identifying a set of bandable routines. In some embodiments, at least one bandable routine identifier (referred to as the receiving bandable routine identifier) in the set of bandable routine identifiers identifies a bandable routine that processes output data produced by another bandable routine identified by another bandable routine identifier in the set. In other words, the source data processed by at least one bandable routine (referred to as the receiving bandable routine) in the set of bandable routines is the output data produced by another bandable routine in the set. For example, as shown in FIG. 2, part of the source data processed by the blend routine is the output data produced by the color correction 1 routine.

In some embodiments, other than the receiving bandable routine identifier, each bandable routine identifier in the set of bandable routine identifiers identifies a bandable routine that produces output data that is processed by another bandable routine identified by another bandable routine identifier in the set. In other words, other than the receiving bandable routine, the output data produced by each bandable routine in the set of bandable routines is the source data processed by another bandable routine in the set. For example, as shown in FIG. 2, the color correction 1 and 2 routines each produce output data that is the source data processed by the blend routine.

A set of bandable routine identifiers identify a set of bandable routines that can be executed more efficiently as a set than as individual routines. Individual execution of bandable routines may be less efficient than execution of the bandable routines as a set, depending on the operations performed by the bandable routines. Determinations as to which bandable routines are performed more efficiently as a set can be made, for example, through use of a look-up table that contains bandable routine identifiers that are to be grouped as a set. When a set of routine identifiers are grouped into a set, the initial list of routine identifiers (determined at 305) is modified (at 317) to produce a modified list of routine identifiers that indicates the grouping. In the modified list of routine identifiers, the set of bandable routine identifiers is a successive set of bandable routine identifiers, i.e., the bandable routine identifiers are positioned consecutively in the modified list.

In some embodiments, grouping (at 315) bandable routine identifiers into one or more sets of bandable routine identifiers further comprises re-ordering the position of one or more routine identifiers in the list to produce a set of successive bandable routine identifiers. For example, suppose the list of routine identifiers contains routine identifiers in the following order: color correction 1, color correction 2, scale, and blend. The method may re-order the position of the scale routine identifier to produce a set of successive bandable routine identifiers (color correction 1, color correction 2, and blend) by placing the scale routine before or after the set of successive bandable routine identifiers in the list. The initial list of routine identifiers is then modified (at 317) to produce a modified list of routine identifiers that indicates the re-ordering of the particular routine identifier.

For each set of bandable routines, the method then computes a particular band size of the sources of the set of bandable routines which is accomplished by performing steps 320 through 330. At step 320, the method identifies the maximum number of buffers simultaneously referenced (accessed) by a set of bandable routines if the set of bandable routines were executed as full frame routines (i.e., if the entirety of each source of the set of bandable routines were processed in one processing pass of the set). The method determines such by identifying the maximum number of buffers simultaneously referenced by each bandable routine in the set of bandable routines and taking the greatest maximum number. The maximum number of buffers simultaneously referenced by a bandable routine may be determined, for example, through use of a look-up table that contains listings of bandable routines and the maximum number of buffers referenced be each.

In the example shown in FIG. 2, each color correction routine requires simultaneous access to two buffers in full frame operation: a first buffer to hold the source data and a second buffer to hold the output data. As a further example, the blend routine requires simultaneous access to three buffers in full frame operation: a first buffer to hold a first source data, a second buffer to hold a second source data, and a third buffer to hold the output data. As such, the set of bandable routines comprising the color correction 1, the color correction 2, and the blend routines simultaneously reference a maximum of three buffers. In an alternative embodiment, each color correction routine requires simultaneous access to only one buffer in full frame operation (a first buffer to hold the source data where the output data is also stored to the first buffer) and the blend routine requires simultaneous access to only two buffers in full frame operation (a first buffer to hold a first source data and a second buffer to hold a second source data where the output data is stored to the first or second buffer thus overwriting the first or second source data). As such, in the alternative embodiment, the set of bandable routines comprising the color correction 1, the color correction 2, and the blend routines simultaneously reference a maximum of two buffers.

The method then identifies (at 325) the number of bytes per row of a buffer used to store sources of the set of bandable routines. In some embodiments, the row bytes of a buffer storing a source is determined by the following equation:

(total pixels in source frame*bytes per pixel)/total rows in source frame.

For example, if the source frame is a Digital Video (DV) full frame having pixel dimensions of 720×480 with 345,600 pixels in the frame, there are 2880 bytes per row (assuming 4 bytes per pixel).

The method also identifies (at 325) the size of the cache (i.e., the amount of data that can be stored to the cache) used by the set of bandable routines during execution. In some embodiments, the cache is located on the same chip as a processor that executes the bandable routines (i.e., an L1 on-chip cache). In some embodiments, the size of the cache overhead is also identified (at 325). Cache overhead is memory space in the cache that is unusable to store data of the image processing routines and contains, for example, operating system or routine code. The size of the cache overhead is subtracted from the size of the cache to determine the usable amount of memory space in the cache.

The method then determines (at 330) a particular band size for each particular set of bandable routines. In some embodiments, a particular band size of the sources of a particular set of bandable routines is determined so that all source data processed by and all output data produced by any routine in the set of routines can be stored to the cache during a single processing pass of the routine whereby the routine processes a single band of its source. In some embodiments, the band size of sources of a set of bandable routines is determined by the following equation:

band size=[(cache size−cache overhead)/buffer number]

where the buffer number is the maximum number of buffers simultaneously referenced by the set of bandable routines.

To determine the number of rows in a source frame (i.e., the height of a band) to be processed in one pass, the band size is integer divided by the number of bytes per row (row bytes) of the buffer(s) used to store input sources of the set of bandable routines. For example, suppose the cache size is 256 KB, the overhead is 25 KB, the buffer number is 3, and the row bytes is 2.88 KB. Therefore, the band size would be [(256 KB−25 KB)/3]=77 KB and the number of rows in each band would be [77 KB\2.88 KB]=26. Thus, in this example, a bandable routine would process 26 rows of its source in each pass.

The method then executes (at 335) image processing routines in an order specified by the initial list of routine identifiers (determined at step 305). If the list of routine identifiers has been modified (at step 315), the method executes (at 335) each routine or set of bandable routines in an order specified by the modified list of routine identifiers to produce the same particular final effect as would be produced by the initial list of routine identifiers. For example, for the routines shown in FIG. 1, the set of bandable routines color correction 1, color correction 2, and blend can be executed as a set (as illustrated in FIG. 2), then the nonbandable scale routine can be executed individually, and lastly, the bandable composite routine can be executed individually. These routines, as a whole, produce a final effect which is the composite of the blended videos 1 and 2 and the scaled still image.

When bandable routines are executed as a set, the set of routines are executed in two or more passes where a single pass of the set comprises each routine in the set processing a single band of its source. Multiple processing passes for the set of bandable routines are performed until each source for each bandable routine in the set is processed "band-by-band." For example, for two bandable routines in a set, the first routine processes a band of its source and the second routine processes a band of its source in a first pass of the set, then the first routine processes a next band of its source and the second routine processes a next band of its source in a second pass of the set, etc. This is repeated until the last bands of the sources for the first and second routines are processed. If the two bandable routines were executed individually, the first routine would process its entire source and then the second routine would process its entire source.

FIG. 2 shows an example of how processing a set of bandable routines can be more efficient than processing bandable routines individually. When the color correction 1, color correction 2, and blend routines are executed as a set, only data transfers from the cache 230 to another memory source 245 after each pass of the set are required. As shown in FIG. 2, since the routines (CC1 and CC2) producing the color corrected bands of videos 1 and 2 are performed just before the blend routine, the data for the color corrected bands of videos 1 and 2 should still be in the cache 230. Therefore, all data needed for the blend routine in one pass should still be in the cache 230 and would not need to be retrieved from another memory resource. If these routines were executed individually, more data transfers to and from the cache are necessary: data would need to be transferred from the cache 230 to another memory source 245 after both color correction 1 and 2 routines are performed, data would need to be transferred to the cache 230 from another memory source 245 just before the blend routine, and data would need to be transferred from the cache 230 to another memory source 245 after the blend routine.

Section II: Determining a List of Routine Identifiers

The list of image processing routine identifiers (determined at 305 of FIG. 3) contains multiple routine identifiers (e.g., color correction, blend, scale, composite, etc.) listed in a specific order. When executed in a set of instruction code, the routine identifiers (i.e., pointers) call routines (i.e., objects) that contain further code to perform particular image processing routines (e.g., color correction, blend, etc.). These image processing routines are selected by a user through a user interface (e.g., graphical user interface). For example, through the user interface, a user can select a color correction routine to be performed on a first video source (video 1), a color correction routine to be performed on a second video source (video 2), etc.

A representation of the selected image processing routines and effects are presented in the user interface and an internal representation of the selected image processing routines and effects is stored in an internal data structure as well. An internal representation is similar to the representation shown in the user interface and shows the connections between image processing routines and video effects. A final video effect to be presented for display can be represented in the internal representation as an effect tree, the internal representation being comprised of a plurality of effect trees.

Figure 4:
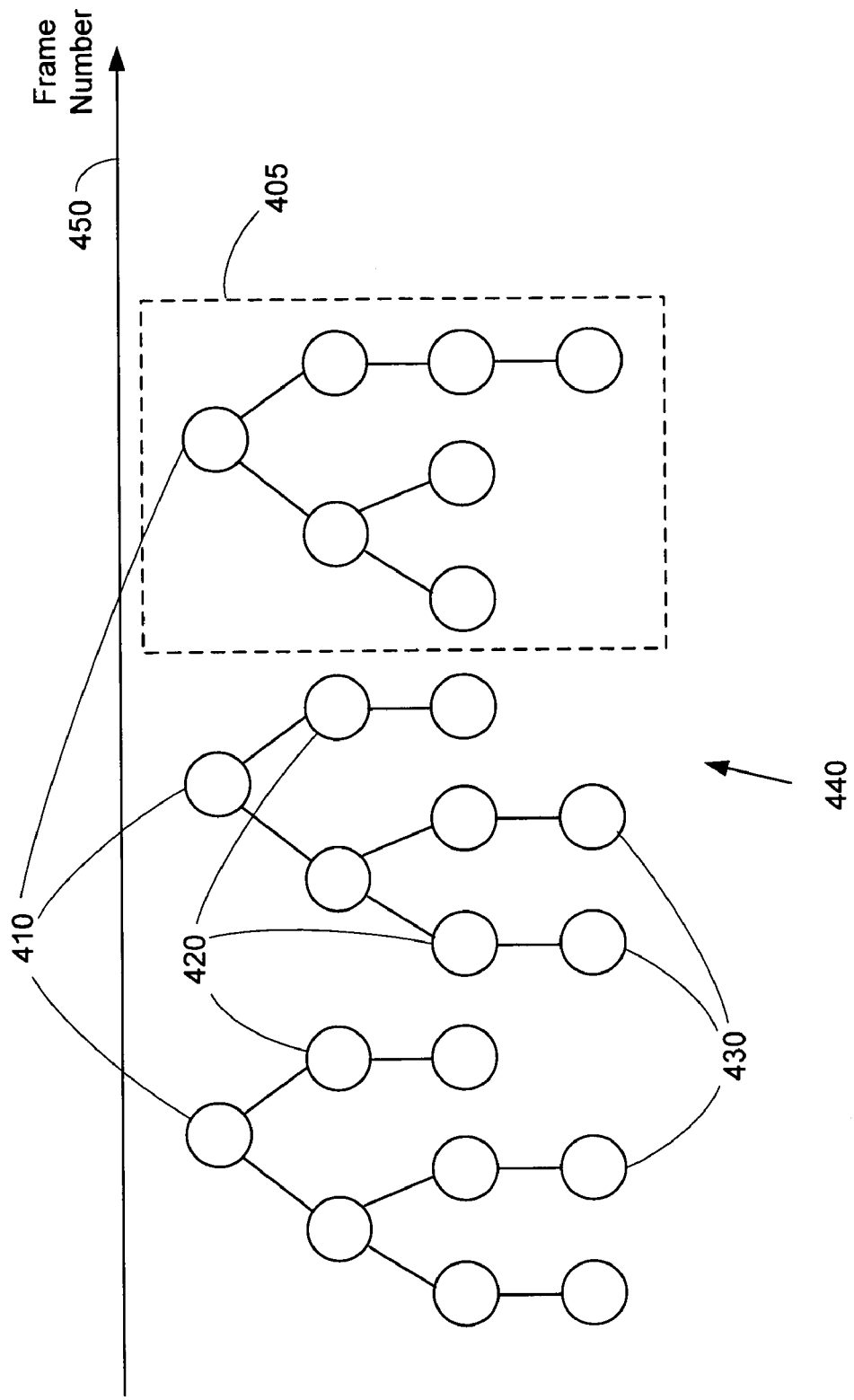
FIG. 4 shows a conceptual illustration of an internal representation of effect trees.

FIG. 4 shows a conceptual illustration of a portion of an internal representation of effect trees 405. An effect tree 405 is comprised of a final effect node 410, zero or more sub-effect nodes 420, and one or more video source nodes 430. Sub-effect nodes 420 are inputs (sources) of the final effect node 410 that are needed to produce the final effect node 410. A sub-effect node 420 may also be an input (source) of another sub-effect node 420. Each video source node 430 contains a video source identifier and each final effect and sub-effect node 410 and 420 contains an image processing routine identifier used to call a corresponding routine for execution in order to produce the final effect or sub-effect node.

A final effect node 410 represents a single frame that is outputted and presented for display. To produce the final effect node 410, typically, an output manager determines all inputs nodes of the final effect node 410 and uses video source and routine identifiers contained in the nodes to call video sources and routines specified by the identifiers. The output manager passes parameter values to each called routine and, in return, receives processed values from the called routine. The output manager does so for each sub-effect node 420 of a final effect node 410 to produce a frame for display. As such, an effect tree 440 is processed for each displayed frame. An axis 450 represents frame numbers for displayed frames.

Typically, for rendering purposes, the output manager only requires the internal representation to perform calls to image processing routines in order to produce a displayed frame. For playback purposes, however, a translation is typically made from the internal representation to an application representation (e.g., a QuickTime representation). In an application representation, the axis 450 represents time periods that a particular frame (final effect node 410) is continually outputted for display. For example, the axis 450 may contain a first time period (e.g., from 0 to 5 seconds) where a first final effect node 410 is continually outputted, a second time period (e.g., from 5 to 7 seconds) where a second final effect node 410 is continually outputted, and a third time period (e.g., from 7 to 8 seconds) where a third final effect node 410 is continually outputted. As such, in an application representation, there is one effect tree 405 for each time period whereas in the internal representation, there is one effect tree 405 for each displayed frame.

In either the rendering or playback cases, the output manager processes the internal or application representation to generate calls to image processing routines to produce a displayed frame (final effect). In some embodiments, calls to routines from the output manager are stored to a data structure to produce a list of routine identifiers used to produce a particular final effect.

Figure 5:
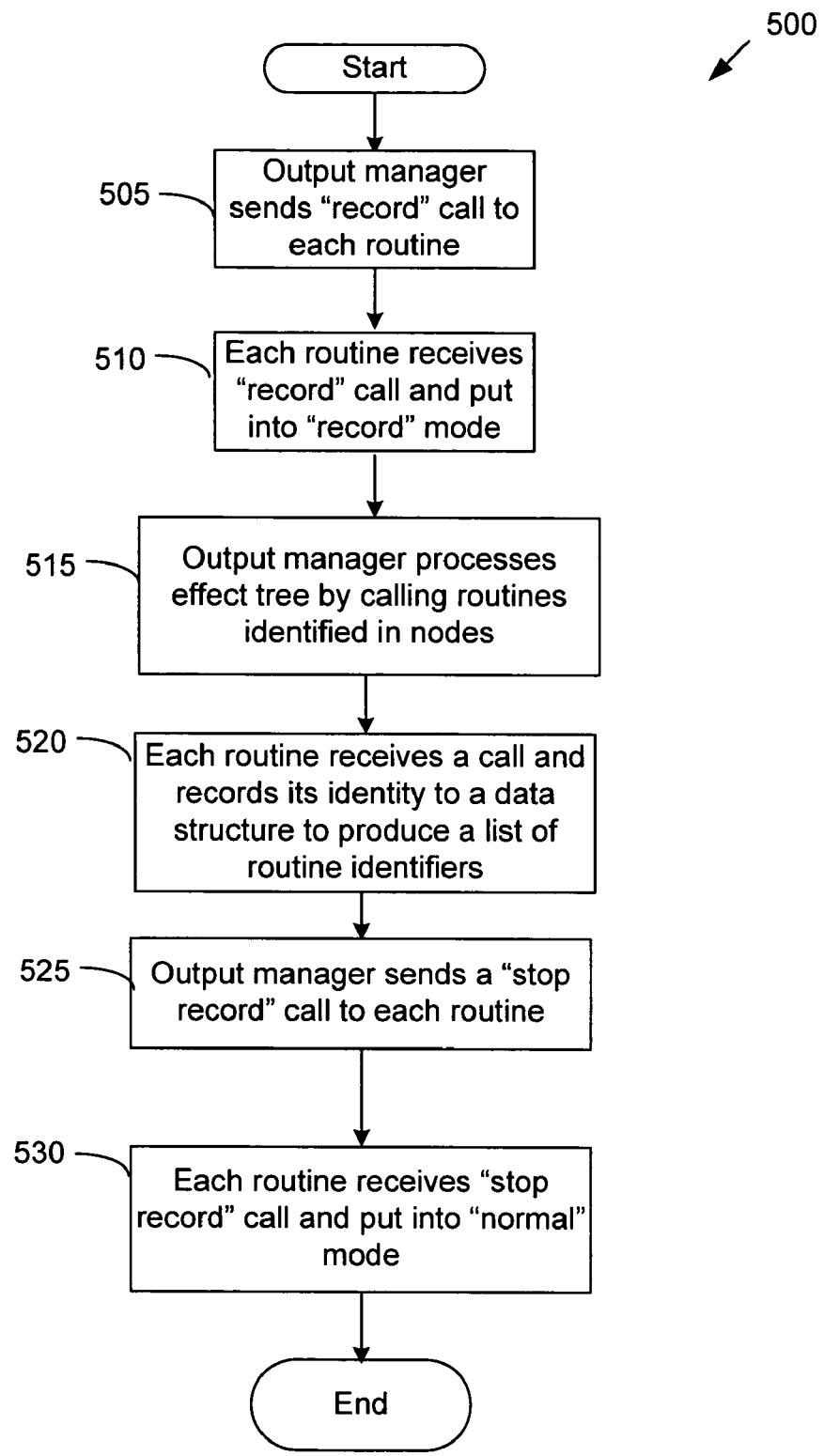
FIG. 5 is a flowchart of a method for determining a list of routine identifiers used to produce a final effect.

FIG. 5 is a flowchart of a method 500 for determining a list of routine identifiers used to produce a final effect. FIG. 5 is described in relation to FIG. 4. This method is used to review an effect tree comprised of a final effect node 410, sub-effect nodes 420, and video source nodes 430. Each effect node 410 and 420 contains an image processing routine identifier that is used to call a corresponding image processing routine.

The method begins when an output manager sends (at 505) a "record" call to each image processing routine contained in a node of the effect tree. Each routine receives (at 510) the "record" call that sets the routine into a "record" mode. When a routine is in "record" mode, upon later receiving a call and one or more parameter values from the output manager, the routine only records (i.e., stores) to a data structure its identity (i.e., its routine identifier) and the received values.

The output manager then processes (at 515) the effect tree by calling routines identified by routine identifiers contained in the nodes of the effect tree. The output manager also passes each called routine one or more parameter vales. The output manager processes the effect tree beginning from its video source nodes 430 (which contain no routine identifier so no routine call is generated) and ending at its final effect node 410.

Each routine identified in a node receives (at 520) a call and one or more parameter values from the output manager and records to a data structure its identity (i.e., its routine identifier) and the received parameter values to produce a list of routine identifiers in the data structure. Since the routines are called by the output manager from an order starting from the video source nodes to the final effect node, the list of routine identifiers stored in the data structure are in a specific order needed to produce a particular final effect. Using the effect tree example of FIG. 1, the list of routine identifiers may contain the following routines in this order: 1. color correction 1 (CC1), 2. color correction 2 (CC2), 3. blend, 4. scaling, and 5. composite.

The output manager then sends (at 525) a "stop record" call to each image processing routine contained in a node of the effect tree. Each routine then receives (at 530) the "stop record" call that sets the routine into "normal" mode, i.e., upon later receiving a call and one or more parameter values from the output manager, the routine processes the received parameter value(s) and returns processed values to the output manager.

Section III: Further Optimizations Using the List of Routine Identifiers

Once a list of routine identifiers containing routine identifiers in a specific order needed to produce a particular final effect is determined (as described in relation to FIG. 5), the order of the routine identifiers in the list of routine identifiers can be modified to optimize efficient processing of the routines. In addition to the method for performing bandable image processing routines (as described in relation to FIG. 2), the present invention provides methods for modifying the list of routine identifiers to reflect the combining of two or more routines into a single routine (as described in relation to FIG. 6) and to reflect the grouping and reordering of routines to send particular routines to an alternative processor (as described in relation to FIG. 7). These methods can be performed, for example, by the output manager.

Figure 6:
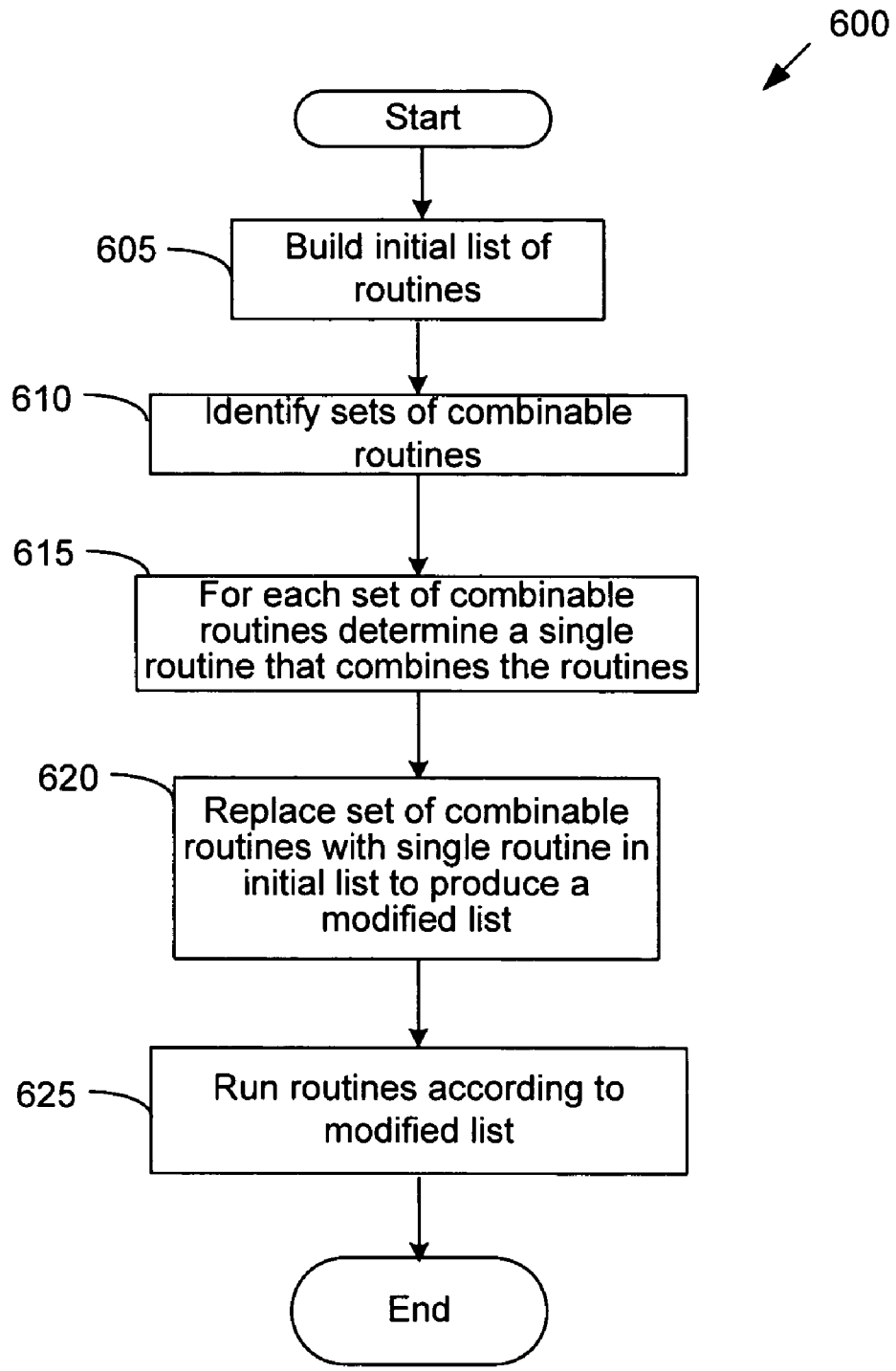
FIG. 6 is a flowchart of a method for combining two or more routines identified in the list of routine identifiers into a single routine and modifying the list accordingly.

FIG. 6 is a flowchart of a method 600 for combining two or more routines identified in the list of routine identifiers into a single routine and modifying the list accordingly. The method 600 begins when an initial list of image processing routine identifiers is determined (at 605), as described in relation to FIG. 5. Routine identifiers are positioned in the initial list of routine identifiers in a specific order (and hence the corresponding routines are called and executed in a specific order) needed to produce a particular final effect.

Using the list of routine identifiers, the method identifies (at 610) any sets of two or more routine identifiers (composing a set of combinable routine identifiers) that identify two or more routines (composing a set of combinable routines) that are combinable into a single routine. For each set of combinable routine identifiers, the method then determines (at 615) a single routine identifier that identifies a single routine that performs each of the routines in the set of combinable routines. Determinations as to which routine identifiers can be grouped into a set of combinable routine identifiers and which routine identifier identifies a single routine that performs each of the routines in the set of combinable routines can be made, for example, through use of a look-up table.

The method then replaces (at 620) each set of combinable routine identifiers in the list with the single routine identifier (determined at 615) to produce a modified list of routine identifiers. The method then executes (at 625) image processing routines in an order specified by the modified list of routine identifiers to produce the same particular final effect as would be produced by the initial list of routine identifiers.

For example, suppose the list of routine identifiers contains the routine identifiers opacity, scale, and blend that identify routines that perform opacity and scale operations on a first video source and perform a blend operation using the first video source and a second video source. The method may identify the opacity, scale, and blend routines as a set of combinable routine identifiers that identify a set of combinable routines. The method may then determine a single routine identifier "blit" that identifies a single routine (a opacity, scale, and blend combination routine) that performs each of the routines in the set of combinable routines. The method then replaces the set of combinable routine identifiers (comprising opacity, scale, and blend) in the list with the single routine identifier "blit" to produce a modified list of routine identifiers (comprising only blit). The method then executes routines in an order specified by the modified list of routine identifiers.

In some embodiments, a series of image processing routines are processed by a first processor (e.g., a central processing unit (CPU)) and a second alternative processor (e.g., a graphics processor). When an alternative processor is used to process a routine, data needed and generated by the alternative processor must be transferred to and from the alternative processor which increases processing time. One method of reducing processing time is to limit the number of incidences data must be transferred to and from the alternative processor for a given series of routines.

Figure 7:
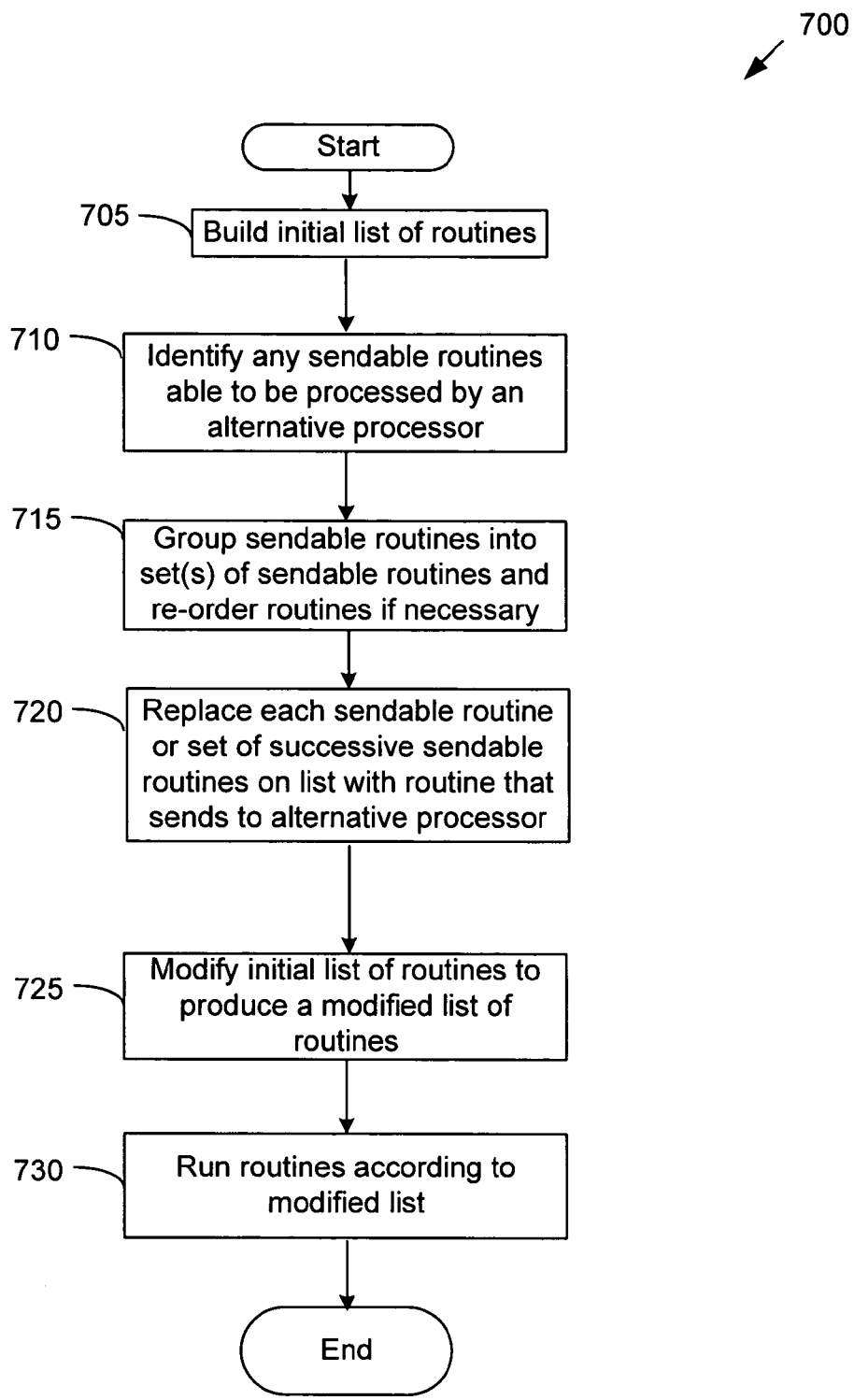
FIG. 7 is a flowchart of a method for grouping and re-ordering routines identified in a list of routine identifiers to send particular routines to an alternative processor for processing.

FIG. 7 is a flowchart of a method 700 for grouping and re-ordering routines identified in a list of routine identifiers to send particular routines to an alternative processor for processing. The method 700 begins when an initial list of image processing routine identifiers is determined (at 705), as described in relation to FIG. 5. Routine identifiers are positioned in the initial list of routine identifiers in a specific order needed to produce a particular final effect. The routine identifiers identify corresponding routines that are to be executed on a first processor. In some embodiments, the first processor is a central processing unit (CPU).

Using the list of routine identifiers, the method identifies (at 710) any routines identifiers (referred to as sendable routine identifiers) that identify routines (referred to as sendable routines) that are able to be processed by a second alternative processor. In some embodiments, the second alternative processor is a graphics processor. Routines identifiers that are not sendable routine identifiers are referred to as nonsendable routine identifiers that identify nonsendable routines. Sendable routine identifiers can be determined, for example, through use of a look-up table that contains listings of routine identifiers of routines that are able to be processed by a particular alternative processor.

If possible, the method then groups (at 715) sendable routine identifiers in the initial list into one or more sets of successive sendable routines identifiers. Grouping sendable routine identifiers is performed to reduce the number of data transfers to and from the alternative processor when the sendable routines are called for processing. Sendable routine identifiers to be grouped can be determined, for example, through use of a look-up table. The grouping of routine identifiers is performed only if the resulting modifications produce the same particular final effect as the initial list of routine identifiers. In some embodiments, grouping sendable routine identifiers into one or more sets of sendable routine identifiers further comprises re-ordering the position of one or more routine identifiers to produce a set of successive sendable routine identifiers whereby the one or more routine identifiers are placed before or after the set of successive sendable routine identifiers in the list.

The method then replaces (at 720) each sendable routine identifier or set of successive sendable routine identifiers in the list with an "alternative processor" routine identifier that identifies an "alternative processor" routine. When called, the "alternative processor" routine sends (pushes) the sendable routine or set of sendable routines identified by a sendable routine identifier or set of successive sendable routine identifiers, respectively, to an alternative processor for processing and then receives (pulls) data produced by the sendable routine or set of sendable routines, respectively, being processed on the alternative processor.

The initial list of routine identifiers is then modified (at 725) to produce a modified list of routine identifiers that indicates the grouping and/or re-ordering (at 715) of routine identifiers and/or the replacing (at 720) of routine identifiers. The method then executes (at 730) routines in an order specified by the modified list of routine identifiers to produce the same particular final effect as would be produced by the initial list of routine identifiers.

For example, suppose the initial list of routine identifiers contains in a specific order a first, second, and third routine identifier where the first and third routine identifiers identify routines (e.g., scale and flip, respectively) that are able to be processed by an alternative processor. Note that if the routines are called in an order specified by the initial list of routine identifiers, a data transfer to and from the alternative processor is needed for executing the first routine (e.g., scale) and a data transfer to and from the alternative processor is then needed for executing the third routine (e.g., flip).

In accordance with the present invention, the method determines (at 710) that the first and third identifiers are sendable routine identifiers. The method then groups (at 715) the first and third identifiers into a set of successive sendable routines identifiers, for example, by re-ordering the position of the third identifier to be placed just after the first identifier. Note that this re-ordering is done only if the resulting modifications produce the same final effect produced by the initial list of routine identifiers. The method then replaces (at 720) the set of successive sendable routine identifiers with the "alternative processor" routine identifier that identifies the "alternative processor" routine.

The initial list of routine identifiers is then modified (at 725) to produce a modified list of routine identifiers that comprises, in a specific order, the "alternative processor" routine identifier and then the second routine identifier. The method then executes (at 730) routines in an order specified by the modified list of routine identifiers to produce the same particular final effect as would be produced by the initial list of routine identifiers. Note that when the routines are called in an order specified by the modified list of routine identifiers, there is only a data transfer to and from the alternative processor that is needed for executing the first and third routines. As such, the number of data transfers to and from the alternative processor is reduced as compared to the number of data transfers that would occur if routines were performed according the initial list of routine identifiers.

Figure 8:
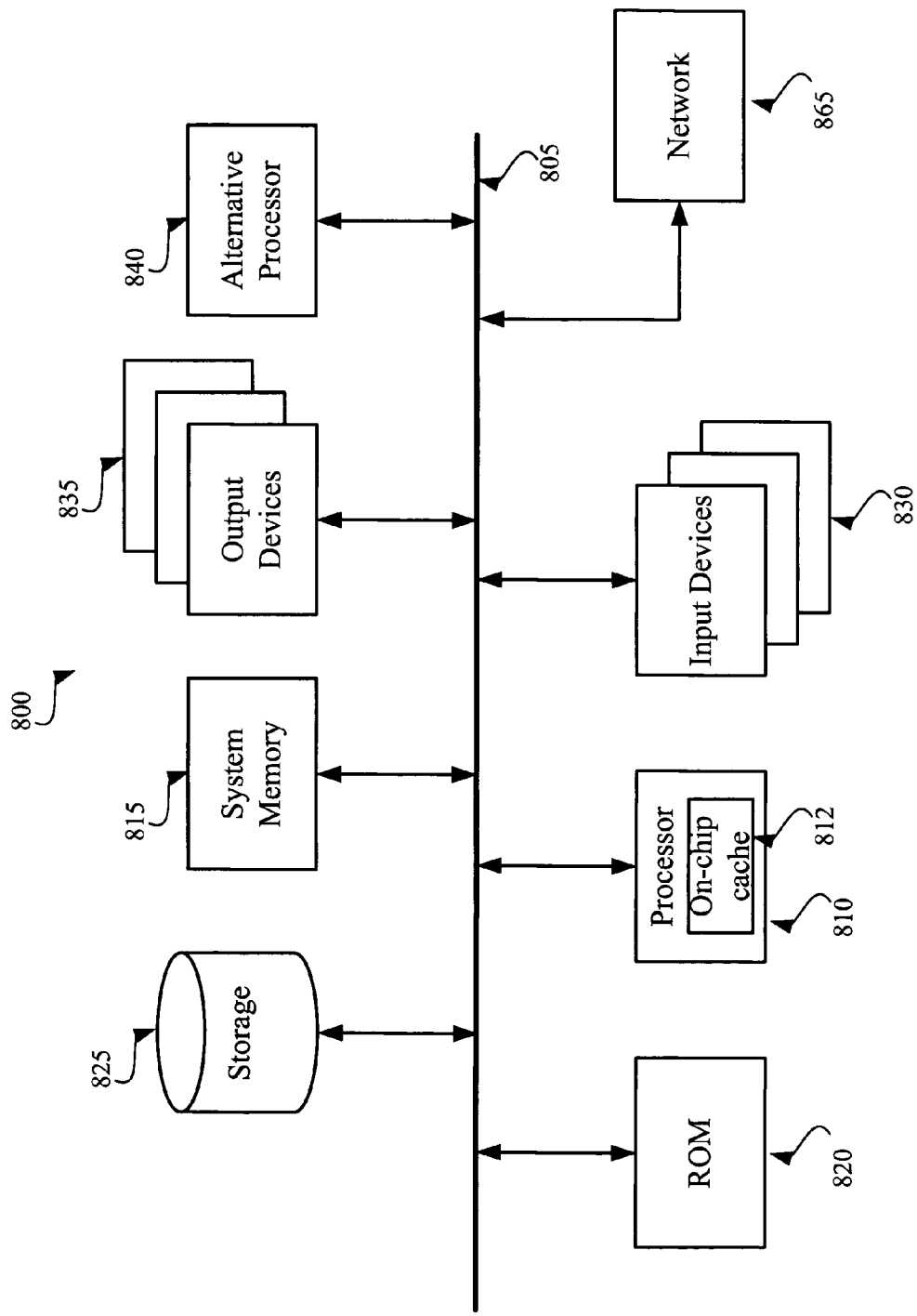
FIG. 8 presents a computer system with which some embodiments of the invention are implemented.

FIG. 8 presents a computer system 800 with which some embodiments of the invention are implemented. Computer system 800 includes a bus 805, a processor 810, a system memory 815, a read-only memory 820, a permanent storage device 825, input devices 830, output devices 835, and an alternative processor 840.

The bus 805 collectively represents all system, peripheral, and chipset buses that communicatively connect the numerous internal devices of the computer system 800. For instance, the bus 805 communicatively connects the processor 810 with the read-only memory 820, the system memory 815, the permanent storage device 825, and the alternative processor 840.

The read-only-memory (ROM) 820 stores static data and instructions that are needed by the processor 810 and other modules of the computer system. The permanent storage device 825, on the other hand, is read-and-write memory device. This device is a non-volatile memory unit that stores instruction and data even when the computer system 800 is off. Some embodiments of the invention use a mass-storage device (such as a magnetic or optical disk and its corresponding disk drive) as the permanent storage device 825. Other embodiments use a removable storage device (such as a floppy disk or zip® disk, and its corresponding disk drive) as the permanent storage device.

Like the permanent storage device 825, the system memory 815 is a read-and-write memory device. However, unlike storage device 825, the system memory is a volatile read-and-write memory, such as a random access memory (RAM). The system memory stores some of the instructions and data that the processor 810 needs at runtime.

In some embodiments, the invention's processes are stored in the system memory 815, the permanent storage device 825, and/or the read-only memory 820. These various memory units may contain, for example, instructions of an output manager application configured to perform methods of the present invention or instruction code of image processing routines. In some embodiments, the system memory 815 and/or the permanent storage device 825 contains a data structure storing a list of routine identifiers and/or a data structure storing a representation of an effect tree. Also, in some embodiments, the system memory 815 and/or the permanent storage device 825 is used as a buffer.

From these various memory units, the processor 810 retrieves instructions to execute and data to process in order to execute the processes of the invention. For example, the processor 810 may retrieve and execute instructions of image processing routines or the output manager application. In some embodiments, the processor 810 uses an on-chip cache 812 (i.e., an L1 cache) to hold data recently accessed or produced by the processor 810. In some embodiments, the processor 810 sends parameter values and image processing routines to the alternative processor 840 and receives processed data from the alternative processor 840.

The bus 805 also connects to the input and output devices 830 and 835. The input devices enable a user to communicate information and select commands to the computer system. For example, through the input devices, the user can select image processing routines to be performed on a video effect. The input devices 830 include alphanumeric keyboards and cursor-controllers. The output devices 835 display images generated by the computer system. For instance, these devices display a user interface (e.g., graphical user interface) through which the user can interface with the computer system 800. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet) or a network of networks (such as the Internet). Any or all of the components of computer system 800 may be used in conjunction with the invention. However, one of ordinary skill in the art would appreciate that any other system configuration may also be used in conjunction with the present invention.

Some embodiments described above relate to the processing of routines in video applications. One of ordinary skill in the art, however, will realize that these embodiments may also relate to the processing of routines in a variety of media applications such as in audio applications. Some embodiments described above relate to video frames in YUV format. One of ordinary skill in the art, however, will realize that these embodiments may also relate to a variety of formats other than YUV. In addition, other video frame formats (such as RGB) can easily be transformed into the YUV format. Furthermore, some embodiments are described with reference to a video effects application. One of ordinary skill in the art, however, will realize that the teachings of the present invention may also relate to other video applications (e.g., teleconferencing, television broadcasting, internet streaming, communication, etc.) in real-time or post-time. Embodiments of the present invention may also be used with video sequences having different coding standards such as H.263 and H.264 (also known as MPEG-4/Part 10).

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method of processing a plurality of image processing routines on a particular processor using a cache of the particular processor, each routine in the plurality of routines processing at least one frame of video data, the method comprising: a) determining an initial list comprising a plurality of routine identifiers positioned in specific order which when executed by the particular processor according to the specific order produce a particular effect, the plurality of routine identifiers identifying the plurality of image processing routines, each routine identifier in the plurality of routine identifiers identifying a corresponding routine in the plurality of routines; b) grouping at least two routine identifiers of the plurality of routine identifiers into a set of routine identifiers that identify a set of routines; c) modifying the initial list of routine identifiers to indicate the grouping of the at least two routine identifiers to produce a modified ordering of the initial list of routine identifiers, wherein said grouping and said modifying are performed by a set of instructions executed by the particular processor; d) executing the routines identified in the modified ordering of routine identifiers by traversing the modified list of routine identifiers to produce the particular effect, wherein said executing comprises executing the identified routines in the modified ordering so that data stored in the cache from at least one previous routine is used for processing a subsequent routine that produces output stored back into the cache; and e) storing output of the routines to a computer-readable medium.

2. The method of claim 1 further comprising:

determining a size of a band of the frames of video data of the set of routines, each frame of video data being comprised of at least two bands where the size of the band is related to a size of the cache; and wherein executing the routines identified in the modified ordering of routine identifiers comprises executing the identified routines in two or more passes, a pass of the set of routines comprising each routine in the set of routines performing a single processing pass where the routine processes at least one band retrieved from the cache to produce output data stored to the cache.

3. The method of claim 2, wherein determining the size of the band comprises determining the size of a band of the frames of video data so that all data processed by and all output data produced by any routine in the set of routines can be stored to the cache during a single processing pass of the routine.

4. The method of claim 2, wherein determining the size of the band comprises determining the size of a band using the following equation:

band size=[(cache size−overhead)/buffer number], where the cache overhead is memory space in the cache that is unusable to store data of the set of routines and the buffer number is the maximum number of buffers simultaneously accessed by the set of routines if the entirety of each frame of video data of the set of routines were processed in one processing pass of the set of routines.

5. The method of claim 1 wherein:
grouping at least two routine identifiers comprises re-ordering a position of a particular routine identifier in the initial list of routine identifiers to produce the set of routine identifiers; and modifying the initial list of routine identifiers comprises modifying the initial list of routine identifiers to indicate the re-ordering of the particular routine identifier to produce the modified ordering of routine identifiers.

6. A method of executing a set of at least two image processing routines on a processor using a particular cache, each routine in the set of routines processing at least a frame of video data, the method comprising: a) determining a size of a band of a frame of video data based on a size of the particular cache, a plurality of buffers referenced within said particular cache by said set of routines, and cache overhead, wherein the cache overhead is memory space in the particular cache that is unusable to store data of the set of routines, wherein the frame of video data is divisible into at least two bands; and b) executing the set of at least two routines in at least first and second passes to produce a particular effect, wherein the first pass performs a first subset of the set of routines on at least one band retrieved from the particular cache to produce output data stored to the particular cache and the second pass performs a second subset of the set of routines on the output data of the first pass that is retrieved from the particular cache to produce the particular effect that is stored back into the particular cache.

7. A method of executing a plurality of image processing routines on a processor using a particular cache by reusing data stored in the particular cache, each routine in the set of routines processing at least a frame of video data, the method comprising: a) determining a size of a band of a frame of video data, wherein the frame of video data is divisible into at least two bands; and b) executing the plurality of routines in at least first and second passes, the first pass performing each routine in a first subset of the set of routines on a first band referenced by said routine and retrieved from the particular cache, in order to produce output data stored to the particular cache, and the second pass performing each routine in a second subset of the set of routines on a second band referenced by said routine and retrieved from the particular cache in order to produce output data stored to the particular cache; and c) retrieving the output data of the first pass and the output data of the second pass from the cache to derive an output for the image processing.

8. The method of claim 7 further comprising determining the size of the band based on a size of the cache.

9. The method of claim 8 further comprising determining the size of the band so that all frames of video data processed by and all output data produced by any routine in the set of routines can be stored to the cache during a single processing pass of the routine.

10. The method of claim 8, wherein determining the size of the band further comprises determining the size of the band using the following equation:

band size=[(cache size−overhead)/buffer number], where the cache overhead is memory space in the cache that is unusable to store data of the set of routines and the buffer number is the maximum number of buffers simultaneously accessed by the set of routines if the entirety of each frame of video data of the set of routines were processed in one processing pass of the set of routines.

11. The method of claim 7 further comprising the processing of the plurality of bands during a single pass, wherein each band is associated with a separate frame of video data.

12. The method of claim 7, wherein the plurality of bands retrieved from the cache are associated with a single frame of video data.

13. The method of claim 7, wherein the plurality of bands retrieved from the cache are associated with separate frames of video data.

14. A computer-readable medium that stores a computer program comprising executable code, the computer program for executing a set of at least two image processing routines on a processor using a particular cache, each routine in the set of routines processing at least a frame of video data, the computer program comprising sets of instructions for: a) determining a size of a band of a frame of video data based on a size of the particular cache, a plurality of buffers referenced within said particular cache by said set of routines and cache overhead, wherein the cache overhead is memory space in the particular cache that is unusable to store data of the set of routines, wherein the frame of video data is divisible into at least two bands; and b) executing the set of at least two routines in at least first and second passes to produce a particular effect, wherein the first pass performs a first subset of the set of routines on at least one band retrieved from the particular cache to produce output data stored to the particular cache and the second pass performs a second subset of the set of routines on the output data of the first pass that is retrieved from the particular cache to produce the particular effect that is stored back into the particular cache.

15. A computer-readable medium that stores a computer program comprising executable code, the computer program for executing a plurality of image processing routines on a processor using a particular cache by reusing data stored in the particular cache, each routine in the set of routines processing at least a frame of video data, the computer program comprising sets of instructions for: a) determining a size of a band of a frame of video data, wherein the frame of video data is divisible into at least two bands; and b) executing the plurality of routines in at least first and second passes, the first pass of the set of routines comprising performing each routine in a first subset of the set of routines processing on a plurality of bands first band referenced by said routine and retrieved from the particular cache, in order to produce output data stored to the particular cache, and the second pass performing each routine in a second subset of the set of routines on a second band referenced by said routine and retrieved from the particular cache in order to produce output data stored to the particular cache; and c) retrieving the output data of the first pass and the output data of the second pass from the cache to derive an output for the image processing.

16. The computer-readable medium of claim 15 further comprising determining the size of the band based on a size of the cache.

17. The computer-readable medium of claim 16, wherein determining the size of the band comprises determining the size of a band of the frame of video data using the following equation:

band size=[(cache size−overhead)/buffer number], where the cache overhead is memory space in the cache that is unusable to store data of the set of routines and the buffer number is the maximum number of buffers simultaneously accessed by the set of routines if the entirety of each frame of video data of the set of routines were processed in one processing pass of the set of routines.

18. The computer-readable medium of claim 15, wherein the plurality of bands retrieved from the cache are associated with separate frames of video data.

\* \* \* \* \*